(12) United States Patent
Rydbeck (10) Patent No.: US 6,377,827 B1
(45) Date of Patent: *Apr. 23, 2002

(54) MOBILE TELEPHONE HAVING A FOLDING ANTENNA

(75) Inventor: Nils Rydbeck, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/596,462

(22) Filed: Jun. 19, 2000

Related U.S. Application Data

(63) Continuation of application No. 09/161,183, filed on Sep. 25, 1998, now abandoned.

(51) Int. Cl.⁷ .................................................. H04B 1/38
(52) U.S. Cl. ......................... 455/575; 455/90; 379/433; 343/702
(58) Field of Search .......................... 455/575, 90, 350, 455/351, 349, 347, 128, 129; 379/428, 433; 343/702

(56) References Cited

U.S. PATENT DOCUMENTS

| 5,014,346 A | | 5/1991 | Philips et al. | |
|---|---|---|---|---|
| 5,170,173 A | | 12/1992 | Krenz et al. | |
| 5,461,672 A | | 10/1995 | Enokido et al. | |
| 5,513,383 A | | 4/1996 | Tsao | |
| 5,535,435 A | * | 7/1996 | Balzano et al. | 455/90 |
| 5,630,211 A | * | 5/1997 | Nagai | 455/90 |
| 5,734,716 A | * | 3/1998 | Kulberg | 455/90 |
| 5,752,204 A | * | 5/1998 | Epperson et al. | 455/90 |
| 5,809,403 A | * | 9/1998 | MacDonald, Jr. et al. | 455/90 |
| 5,907,615 A | | 5/1999 | Kaschke | |
| 5,963,640 A | * | 10/1999 | Rabe | 379/433 |
| 5,995,052 A | * | 11/1999 | Sadler et al. | 379/433 |

FOREIGN PATENT DOCUMENTS

| EP | 0 036 442 A1 | 9/1981 |
|---|---|---|
| EP | 0 644 607 A1 | 3/1995 |
| EP | 0694985 A1 | 1/1996 |
| GB | 2308938 A | 7/1997 |
| WO | WO 94/13088 | 6/1994 |
| WO | WO97/26714 | 7/1997 |

* cited by examiner

Primary Examiner—Doris H. To
(74) Attorney, Agent, or Firm—Coats & Bennett, P.L.L.C.

(57) ABSTRACT

A mobile telephone having a movably mounted antenna and speaker. The mobile telephone includes a housing structure having a top, a pair of sides, back and a front panel including a keypad area and a display. Formed about a top portion of the telephone is a transverse axis. Rotatably mounted in coaxial relationship to the transverse axis is an L-shaped antenna and a speaker unit. In a retracted position, both the antenna and the speaker unit assume a retracted position where the speaker is disposed adjacent the front panel of the telephone while the antenna overlies the speaker. In an extended position, both the antenna and the speaker unit are moved away from the front panel of the telephone and the speaker unit is normally disposed inwardly of the antenna.

19 Claims, 7 Drawing Sheets

Fig.10 ary to reduce the size of the electronic hardware associated with these handheld phones in order that the size of the overall phone package may also be reduced accordingly. While such lightweight and compact phones may be easily carried on the user's person as a result of the reduced physical size, it is sometimes the case that the ease of operation of the resulting compact phone unit is impaired. In particular, the antenna traditionally employed on such compact cellular telephones is often required to be positioned so close to the user's head during operation that it can affect the efficiency of the antenna itself and impair the user's ability to easily handle the phone. While typical cellular phones employ either a rigid telescoping antenna or a flexible fixed length antenna, such antennas are still disposed in close proximity to the user's head during use, and therefore can interfere with the user's ability to easily operate the phone.

MOBILE TELEPHONE HAVING A FOLDING ANTENNA

This is a continuation of application Ser. No. 09/161,183, filed Sep. 25, 1998, now abandoned.

FIELD OF THE INVENTION

The present invention relates to telephones and more particularly to mobile telephones having antennas and/or speakers that are movably mounted about the housing of the telephone.

BACKGROUND OF THE INVENTION

More than any other factor, consumer demand for lightweight and compact cellular telephones has driven the mobile telephone industry to continually reduce the size of the electronic hardware associated with these handheld phones in order that the size of the overall phone package may also be reduced accordingly. While such lightweight and compact phones may be easily carried on the user's person as a result of the reduced physical size, it is sometimes the case that the ease of operation of the resulting compact phone unit is impaired. In particular, the antenna traditionally employed on such compact cellular telephones is often required to be positioned so close to the user's head during operation that it can affect the efficiency of the antenna itself and impair the user's ability to easily handle the phone. While typical cellular phones employ either a rigid telescoping antenna or a flexible fixed length antenna, such antennas are still disposed in close proximity to the user's head during use, and therefore can interfere with the user's ability to easily operate the phone.

In addition to the above concerns, the small physical size of the cellular telephone unit can also present concerns with regard to the relative positioning of the speaker and microphone of the phone. More particularly, the desire to produce a phone unit that is small and physically compact often results in a phone which has a relatively short separation or distance between the speaker and the microphone. In some cases, the speaker to microphone separation can be so small that the phone is difficult to use. That is, the speaker and microphone are positioned so close to one another that it is difficult for the ear and mouth of a user to be positioned sufficiently close to the speaker and microphone such that audio can be clearly transmitted between the user and the phone.

Therefore, there continues to be a need for a practical, cost effective cellular or mobile phone which is lightweight and physically compact, and which further provides an overall phone design where the antenna does not interfere with the use of the phone and wherein the effective distance between the speaker and microphone can be extended in order to position the speaker and microphone closer to the user's ear and mouth respectively.

SUMMARY OF THE INVENTION

The present invention entails a mobile telephone having a movable antenna and speaker. In one embodiment, the telephone is provided with a folding antenna that is movable back and forth between a retracted position where the antenna lies closely adjacent to the housing of the telephone and an extended position where the antenna projects outwardly away from the telephone housing. In another embodiment, the telephone includes a movable speaker that moves between a retracted position where the speaker is disposed adjacent the telephone housing and an extended position where the speaker extends outwardly away from the housing and the distance between the speaker and the microphone is increased.

In one particular embodiment of the present invention, the telephone includes both a movable speaker and antenna. Here the speaker and antenna are coaxially mounted about a transverse pivot axis that is disposed about an upper or top portion of a telephone. Both the speaker and antenna rotate about the pivot axis and are movable between retracted and extended positions. In the retracted position, both the speaker and antenna fold against the front or keyboard area of the telephone, with the speaker itself being sandwiched between the front panel of the telephone housing and the antenna which in this embodiment may include a generally planar or panel type antenna. When extended, the speaker and antenna are rotated from the retracted position where the speaker assumes an intermediate position between the front of the telephone housing and the antenna while the antenna is further rotated away from the speaker such that there are angular separations between the front of the telephone housing, the speaker and the antenna.

More particularly, in one design, the antenna assumes a generally L-shaped configuration and includes first and second legs. In this case, the pivot axis is disposed across the top-back edge portion of the telephone housing. In the retracted position, the L-shaped antenna is folded back against the telephone housing such that the first leg overlies a top portion of the housing while the second leg overlies a portion of the front of the telephone housing. As suggested above, in this case, a movable speaker can be provided and when the antenna is disposed in the retracted position, the speaker would assume a position underneath a portion of the antenna.

Finally, in another embodiment of the present invention, the mobile telephone is provided with a speaker that is movable generally rectilinearly between retracted and extended positions. In this case, when the speaker assumes a retracted position it lies within the general confines of the telephone housing as a whole. However, when the speaker is moved to an extended position the speaker tends to project up and outwardly from the confines of the telephone housing.

It is therefore an object of the present invention to provide a small and physically compact mobile telephone with an efficient antenna that does not substantially impair the use of the telephone.

Another object of the present invention is to provide a small and physically compact mobile telephone with a movable speaker that permits the distance between a microphone associated with the telephone and the speaker to be extended such that the speaker and the microphone can be positioned closer to the mouth and ear of the user of the telephone.

Other objects and advantages of the present invention will become apparent and obvious from a study of the following description and the accompanying drawings which are merely illustrative of such invention.

DESCRIPTION OF THE INVENTION

With further reference to the drawings, a mobile telephone of the cellular type is shown therein and indicated generally by the numeral 10. Telephone 10 includes a surrounding housing structure that includes a top 12, a pair of sides 14, a back 16, and a front panel 18. In conventional fashion, the front panel 18 includes a keypad area 18a and a display panel or area 18b.

Disposed about the lower portion of the telephone 10 is a microphone 20. In the case of the embodiments illustrated in FIGS. 1–6, a speaker 22 is also incorporated into the top portion of the telephone. Speaker 22 can be disposed such that the speaker grids formed in the housing appear on the top panel 12 of the telephone or about the upper portion of the front panel 18.

Figures 1, 2:
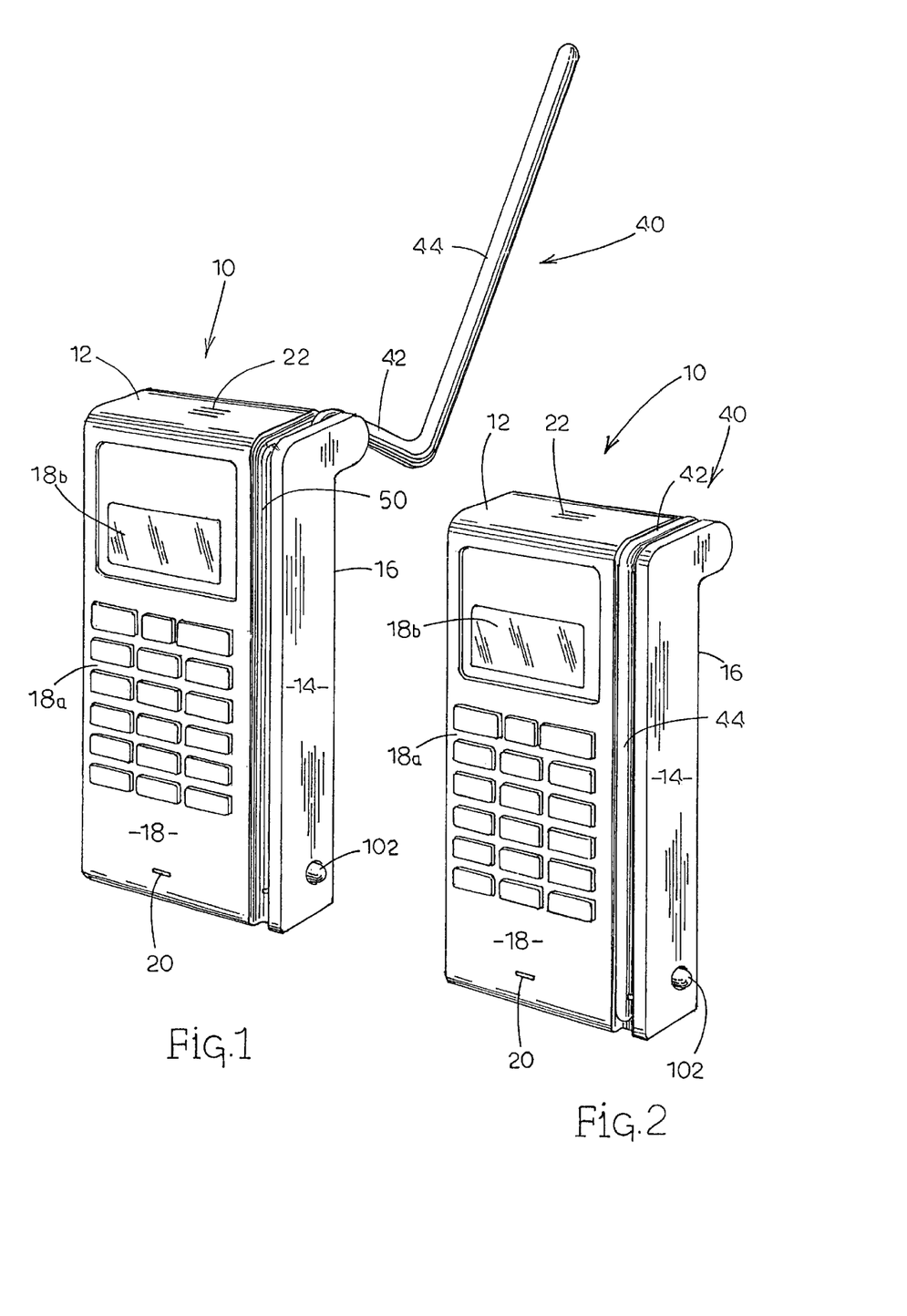
FIG. 1 is a perspective view of the mobile telephone of the present invention with the antenna disposed in an extended position.
FIG. 2 is a perspective view of the mobile telephone with the antenna disposed in a folded and retracted position.

Cellular telephone 10 shown in FIGS. 1 and 2 includes a foldable antenna indicated generally by the numeral 40. Antenna 40 includes a first leg 42 and a second leg 44. Consequently, the antenna 40 shown in FIGS. 1 and 2 is of an L-shaped configuration with the legs 42 and 44 being generally elongated. Antenna 40 is rotatable mounted about a pivot axis that extends transversely across an upper portion of the telephone housing. In the case of the design shown in FIGS. 1 and 2, the transverse pivot axis is disposed about the back edge portion of the top panel 12.

To house the antenna 40 when the same assumes a folded or retracted position, there is provided an L-shaped recessed antenna groove 50 formed about one side of the telephone 10. Note in FIG. 1 where the recessed antenna groove 50 extends across one side portion of the top 12 and then downwardly along one side of the front panel 18. Groove 50 is designed such that the antenna 50 will fit therein when the antenna assumes the retracted position.

Figure 2A:
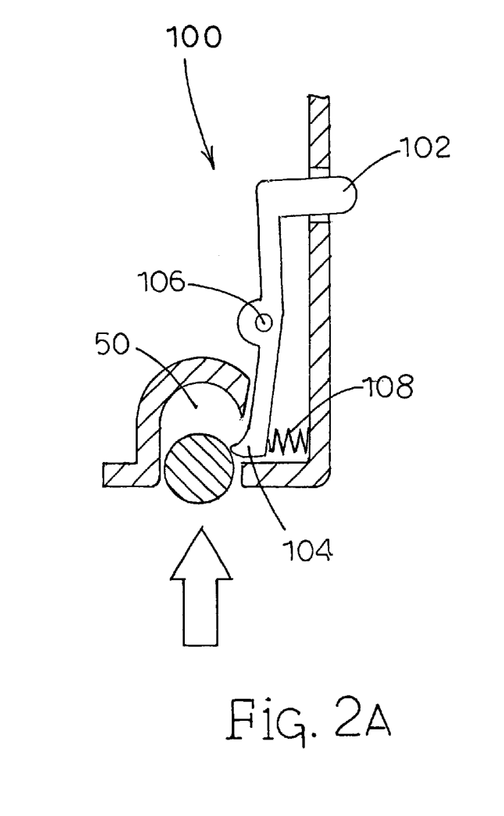
FIGS. 2A–2C are a series of schematic illustrations showing an antenna latch for securing the antenna to the housing of the cellular telephone design shown in FIGS. 1 and 2.
Figure 2B:
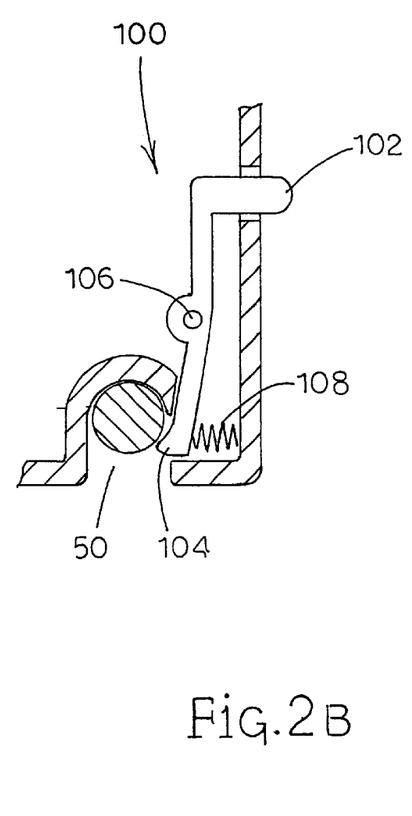
Figure 2C:
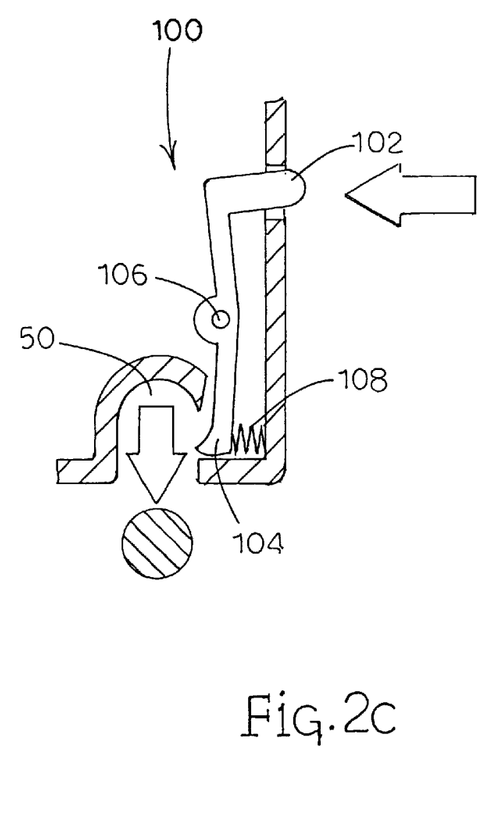

The antenna 40 can be retained within the antenna groove 50 by any number of conventional latch designs. FIGS. 2A–2C illustrate one antenna latch design, indicated generally by the numeral 100, that can be incorporated into the cellular telephone housing for retaining the antenna 40 when the same assumes the folded and stored position shown in FIG. 2. Viewing the antenna latch 100 in more detail, the same includes a pivotally mounted finger actuated paw having an actuating button 102 and a retaining end paw 104. The actuating paw is pivotally mounted within the housing about a pivot pin 106. A spring is interposed between the actuating paw and the housing of the telephone for biasing the paw towards a retained position (FIG. 2B). In the retained position, the leg 42 of the antenna is held within the antenna groove 50 by the paw end 104. To release the leg 42 of the antenna, the actuating button 102 is pressed inwardly towards the housing, which causes the actuating paw to rotate generally counterclockwise about the pivot pin 106. This causes the retaining paw 104 to be moved left to right as viewed in FIG. 2C so as to release the leg 42 of the antenna. To latch the antenna in place, the leg 42 is simply pushed or pressed into engagement with the terminal end of the retaining paw 104, as illustrated in FIG. 2A. Because of the shape of the antenna and the shape of the terminal end of the retaining paw 104, the leg 42 of the antenna is effective to engage the retaining paw 104 and causes the same to pushed from left to right in FIG. 2A, enabling the antenna leg 42 to be pushed into the antenna groove 50 where the retaining paw 104 will engage and hold the antenna leg in a latch position.

The antenna latch shown in FIGS. 2A–2C is simply one example of a latch structure that could be utilized to retain and hold the antenna 40 in a latched or retained position about the housing of the cellular telephone 10. It is appreciated that there are other latch designs that would be effective to retain and hold the antenna in a folded or stored position.

Figure 3:
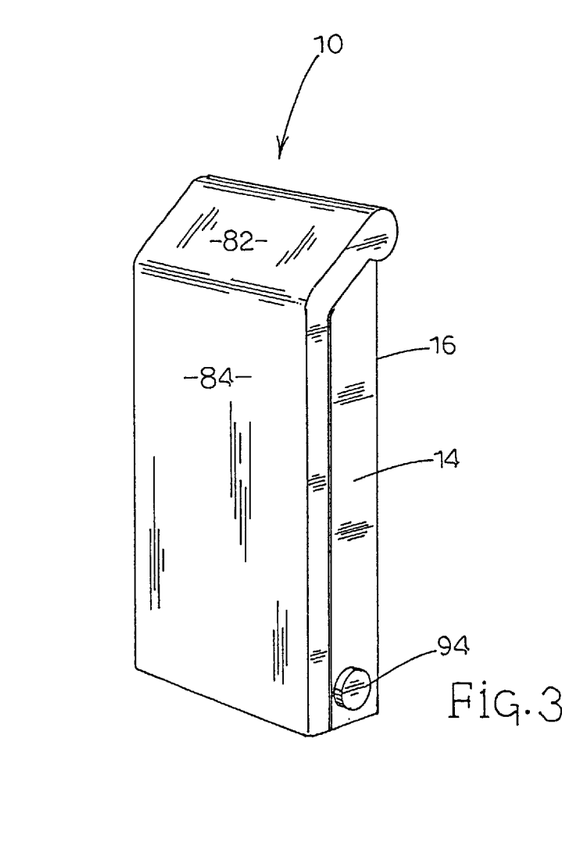
FIG. 3 is a perspective view of a second embodiment of the mobile telephone of the present invention with the antenna assuming a generally planar configuration and disposed in the folded and retracted position.
Figure 4:
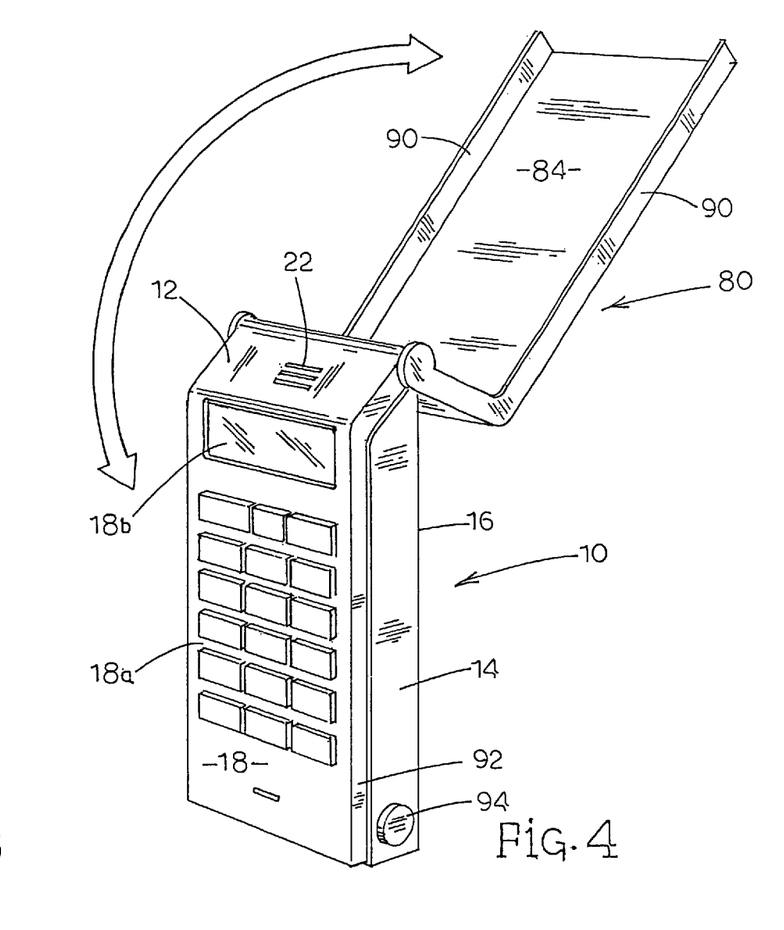
FIG. 4 is a perspective view of the mobile telephone shown in FIG. 3 but with the antenna disposed in an extended position.

Turning to FIGS. 3 and 4, a second embodiment of the mobile telephone 10 is shown therein. The embodiment of FIGS. 3 and 4 is similar to that shown in FIGS. 1 and 2 with the exception that the antenna, indicated generally by the numeral 80, assumes a generally planar construction. More particularly, the foldable antenna 80 includes a first leg 82 that is directly coupled to a transverse pivot axis that extends across the rear portion of the top panel 12 of the telephone 10. Integrally formed with the first leg 82, which assumes a planar or panel type configuration, is a second leg 84 which also assumes a planar or panel type configuration. As seen in the drawings, the pair of panels 82 and 84 that constitute the antenna 80 are disposed in a generally L-shaped configuration. Note also that the antenna 80 includes a pair of opposed side rails 90 that, in the embodiment shown herein, are integral with the first and second legs or panels 82 and 84. Disposed on opposite side edges of the front panel 18 is a pair of rail seats 92. The rail seats 92 are designed to accept the side rails 90 of the antenna such that when the antenna 80 assumes the retracted or folded position shown in FIG. 3, the entire antenna fits cleanly around the top and front panels 12 and 18 of the telephone 10.

Thus, it is appreciated that the antenna 80 shown in the embodiment illustrated in FIGS. 3 and 4, is rotatable about a transverse axis between a retracted or folded position, shown in FIG. 3, and an extended or operative position shown in FIG. 4. It is appreciated that the antenna 80 can, by various conventional means, be biased to assume the retracted position shown in FIG. 3. Also, shown in the embodiment of FIGS. 3 and 4 is a pushbutton actuator 94. The function of the pushbutton actuator 94 is to actuate a latch, such as the latch 100 shown in FIGS. 2A–2C, which engages the antenna 80 when the same assumes the retracted position shown in FIG. 3. Thus, by pressing the actuator 94, such a latch would be released enabling the entire antenna 80 to rotate from the retracted position shown in FIG. 3 to the extended or operative position shown in FIG. 4.

Figures 5, 6:
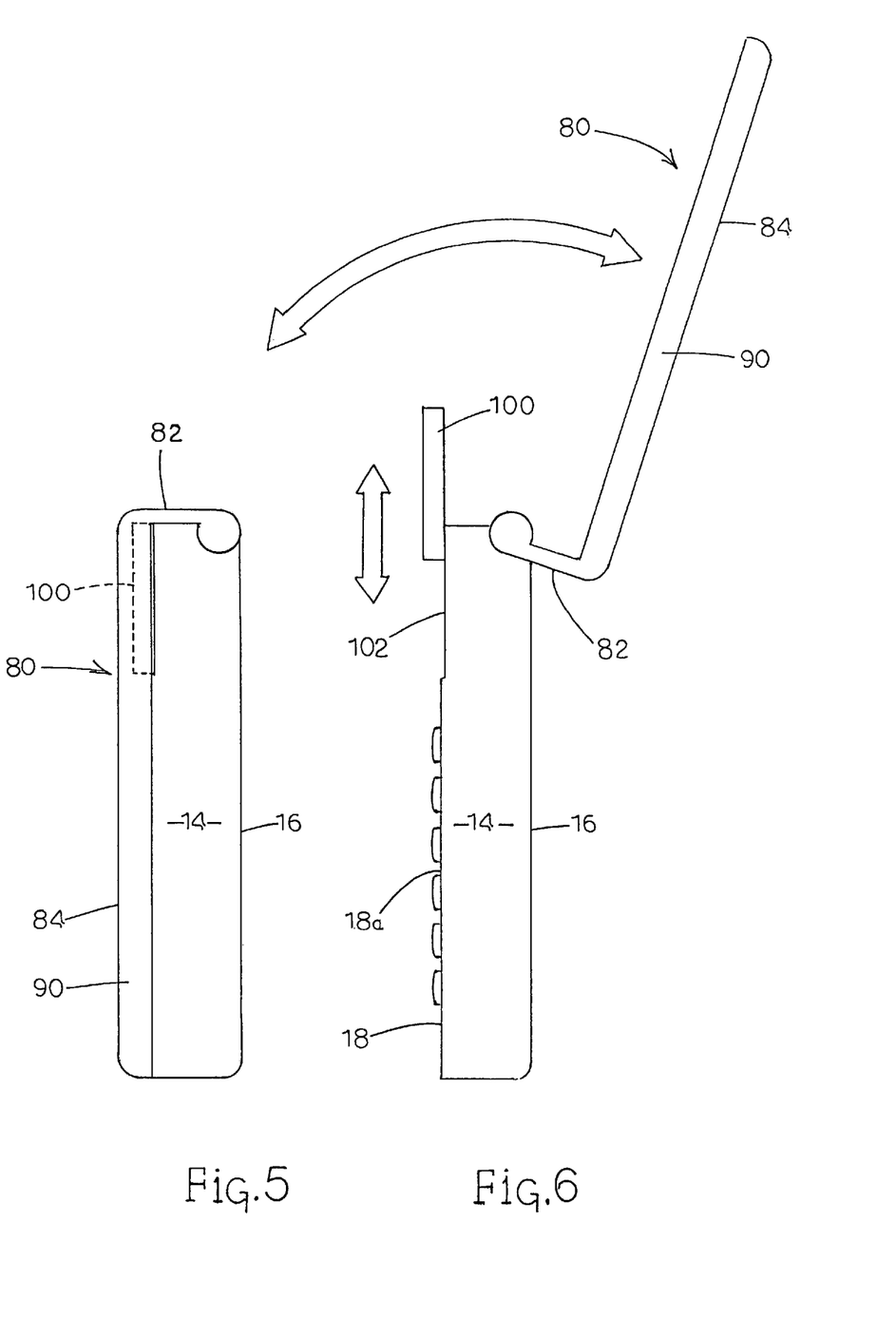
FIGS. 5 and 6 illustrate another embodiment of the present invention, this embodiment illustrating a mobile telephone having a speaker that moves vertically up and down between retracted and extended positions.
Figure 7:
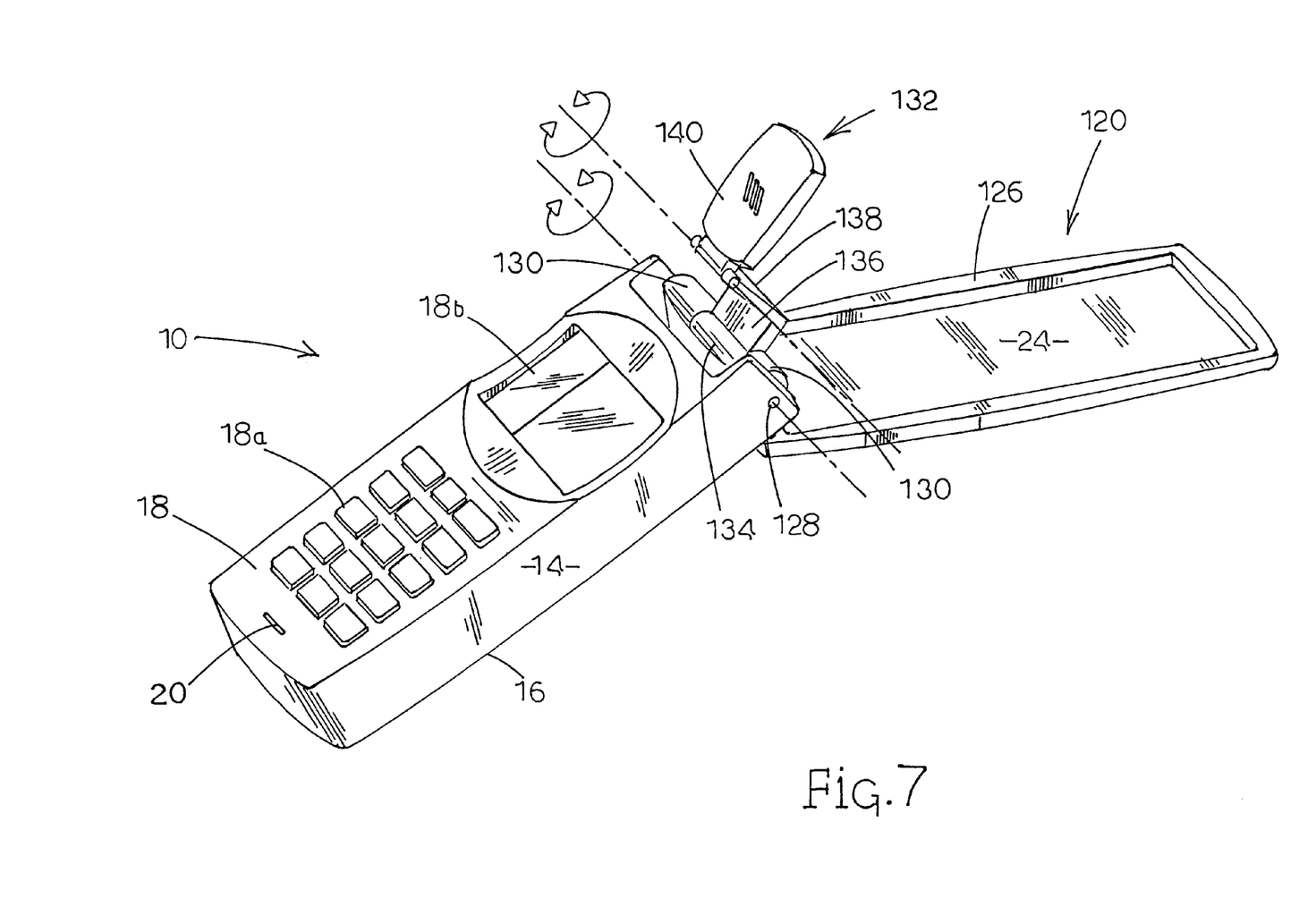
FIG. 7 is a perspective view of another embodiment of the mobile telephone of the present invention, this embodiment illustrating a speaker and a planar antenna, both coaxially mounted about a transverse pivot axis that extends across the top portion of the telephone.

Turning to FIGS. 5 and 6, another embodiment of the present invention is shown. In this embodiment, the mobile telephone 10 includes the same basic antenna construction shown in FIGS. 3 and 4 and described above. However, in addition to the movable or rotating antenna 80, the design or embodiment shown in FIGS. 5 and 6 shows a movable speaker unit 100. As seen in FIGS. 5 and 6, the speaker unit 100 is designed to move from a retracted position shown in FIG. 5 to an extended and operative position shown in FIG. 6. In the retracted position of FIG. 5, the folding antenna 80 is folded down and assumes its retracted position. There, the second leg or second panel 84 generally encompasses and covers the speaker unit 100 which is disposed about a speaker seat 102 that is formed about an upper corner portion of the front panel 18 of the cellular telephone 10. Consequently, speaker unit 100 is designed to move generally rectilinearly from the retracted position of FIG. 5 to the extended position of FIG. 6. Although not shown, speaker unit 100 can be designed to move up and down along one or more guides and can be spring biased to move towards the extended position in response to the actuation of a switch or in response to the selected movement of the antenna 80.

In FIGS. 7–11, another embodiment of the present invention is shown therein, and in this case both an antenna 120 and a speaker unit 132 are mounted about the housing of the telephone 10 for movement between retracted and extended positions.

Referring to the embodiment illustrated in FIG. 7–11, the antenna 120 includes a first panel or leg 122 and a second panel or leg 124. Extending around both panels 122 and 124 is a perimeter run 126. The perimeter run 126 and the panels 122 and 124 are of an integral construction in the design illustrated in FIG. 7–11.

Secured transversely across the top portion of the telephone housing is a pivot axis 128. Formed about an inner end of the antenna 120 adjacent a terminal edge of the first panel 122 is a pair of spaced apart collars 130. Each collar 130 includes an opening extending therethrough, with the opening being particularly sized to fit around pivot axis 128. The openings in the collars 130 can be sized such that the collars frictionally engage the pivot axis 128. In such a case, the entire antenna 120 can be rotated back and forth between the retracted position shown in FIG. 8 and the extended position shown in FIG. 11 in such a manner that the frictional fit existing between the collars 130 and the pivot axis 128 will maintain the antenna 120 in any set position between the retracted and extended positions. In addition, as pointed out above, various means can be incorporated and associated with the pivot axis 128 and collars 130 so as to bias the antenna 120 towards the extended position.

Also secured in coaxial arrangement with the antenna 120 is a speaker unit 132. In particular, the speaker unit 132 is rotatably mounted to the pivot axis 128. Speaker unit 132 includes a central collar 134 that includes an opening through which the pivot axis 128 extends. Extending from the collar 134 is a first panel 136. Extending from the first panel 136 is a second panel 138. Panels 136 and 138 constitute the frame structure of the speaker unit 132 and form a generally L-shaped configuration. Secured to the outer or terminal end of the second panel 138 is a speaker 140. Speaker 140 is pivotally connected to the second panel 138 via a transverse axis. Consequently, the speaker 140 can rotate about this transverse axis relative to the frame members 136 and 138, and the entire frame structure of the speaker unit 132 can rotate about the pivot axis 128.

As shown in FIGS. 7–11, it is seen that the speaker unit 132 is interposed intermediately between the antenna 120 and the front panel 18 of the telephone 10. In the retracted or inoperative position shown in FIG. 8, it is seen that the speaker unit 132 is sandwiched between the antenna 120 and the front panel 18 of the cellular telephone 10. Note in this retracted position, that the frame panels 136 and 138 extend over the top and front panels 12 and 18 of the telephone 10. The front panel 18, in the display area 18b, is formed with a cavity or depression that enables the speaker 140 to generally seat therein when the speaker unit 132 assumes the retracted position.

Figure 8:
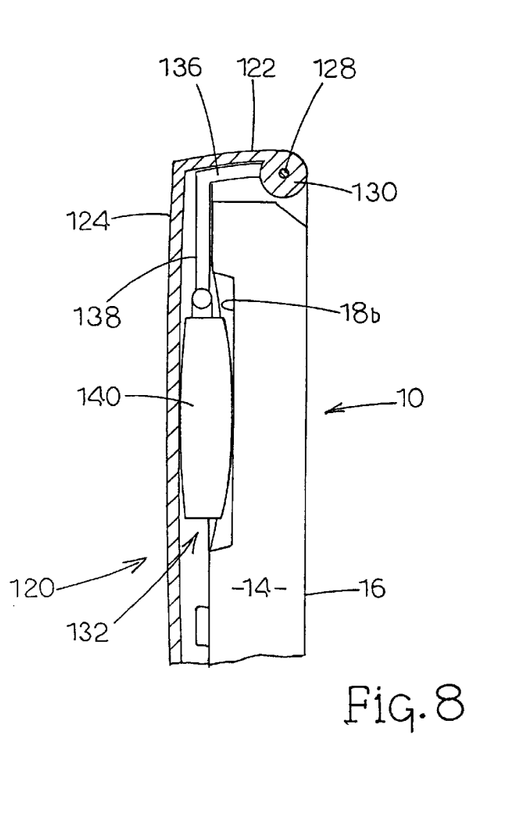
FIG. 8 is a fragmentary side elevational view of the telephone shown in FIG. 7 with certain portions of the antenna shown in section and with both the antenna and speaker being disposed in a folded and retracted position.

Also, in the retracted position shown in FIG. 8, the antenna 120 extends over and generally covers the top 12 and front panel 18 of the telephone 10. Note that the first panel or first leg 122 extends over the top 12 of the telephone while the second panel or second leg 124 extends over the front panel 18 and generally covers the speaker 140 in the process.

Figure 9:
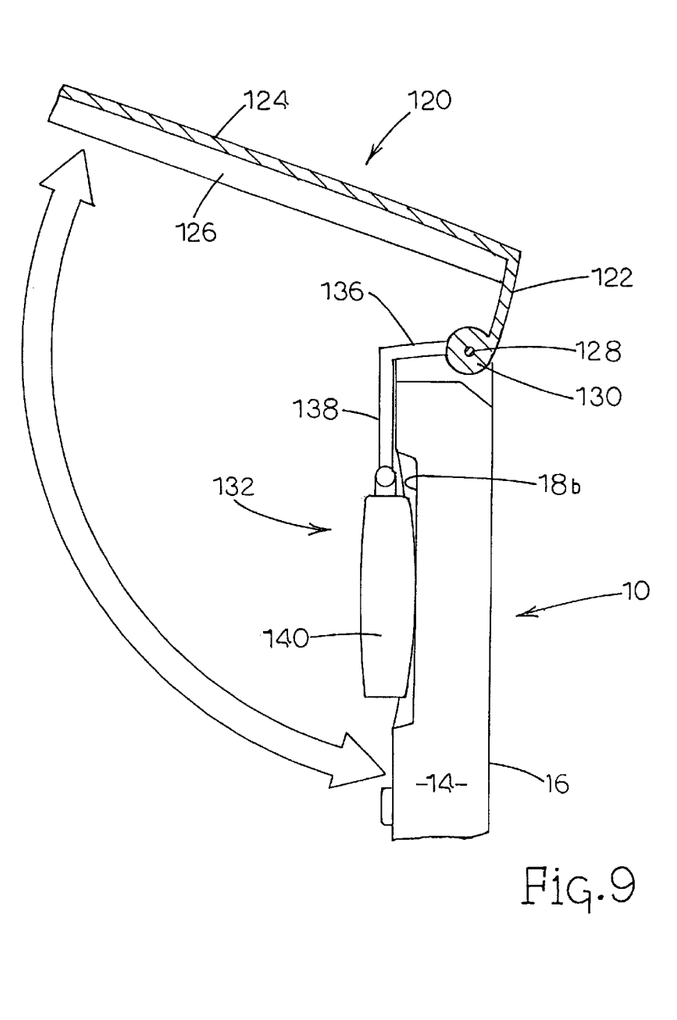
FIG. 9 is a fragmentary side elevational view similar to that shown in FIG. 8 but with the antenna being rotated to a partially open or extended position.
Figure 10:
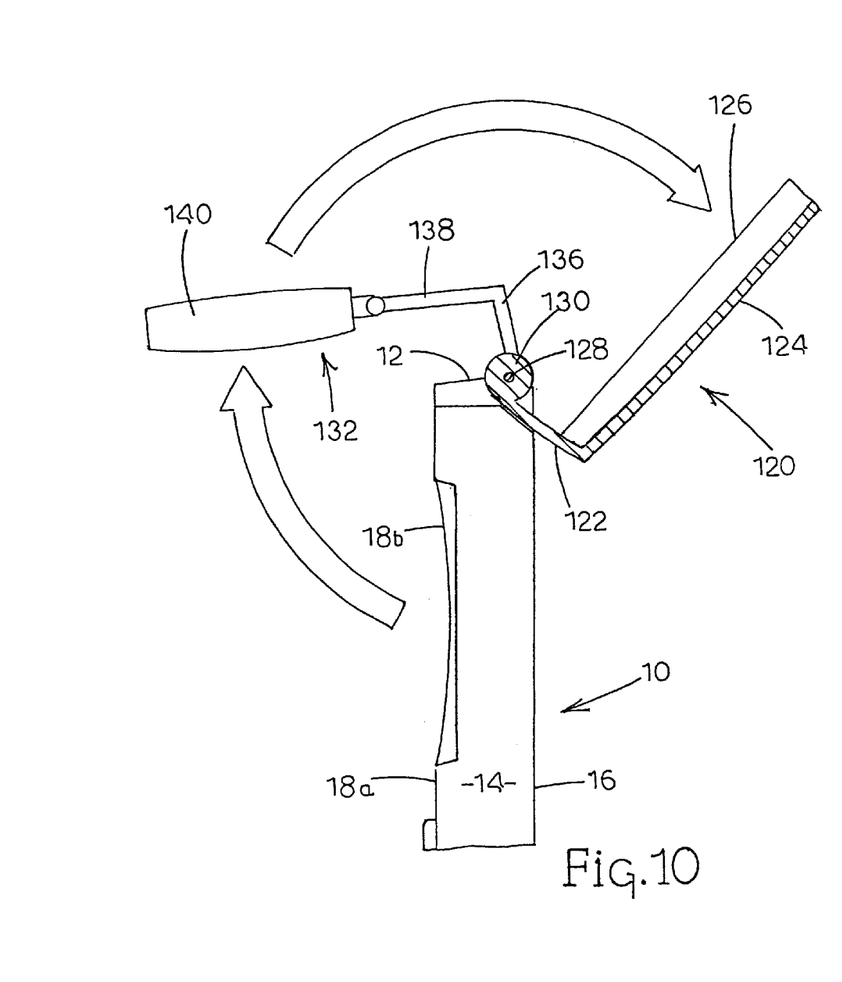
FIG. 10 is a fragmentary side elevational view similar to FIGS. 8 and 9 but with the antenna rotated to its fully extended position and the speaker being rotated to a partially open or extended position.

In FIG. 9, the antenna 120 is rotated clockwise to an intermediate position. Here, the speaker unit 132 remains in the retracted position. In FIG. 10, the antenna 120 has been rotated clockwise to its full extended and operative position. The speaker unit 132 is shown rotated clockwise to an intermediate position. Finally, in FIG. 11, both the antenna 120 and the speaker unit 132 have been rotated clockwise to their full extended positions. In this case, the antenna 120 extends outwardly and away from the telephone 10. When used by a person, it is appreciated that the antenna 120 would extend away from the person's head and, in the process, the phone 10 would be easier to use and at the same time the antenna 120 would be prone to operate more efficiently.

Figure 11:
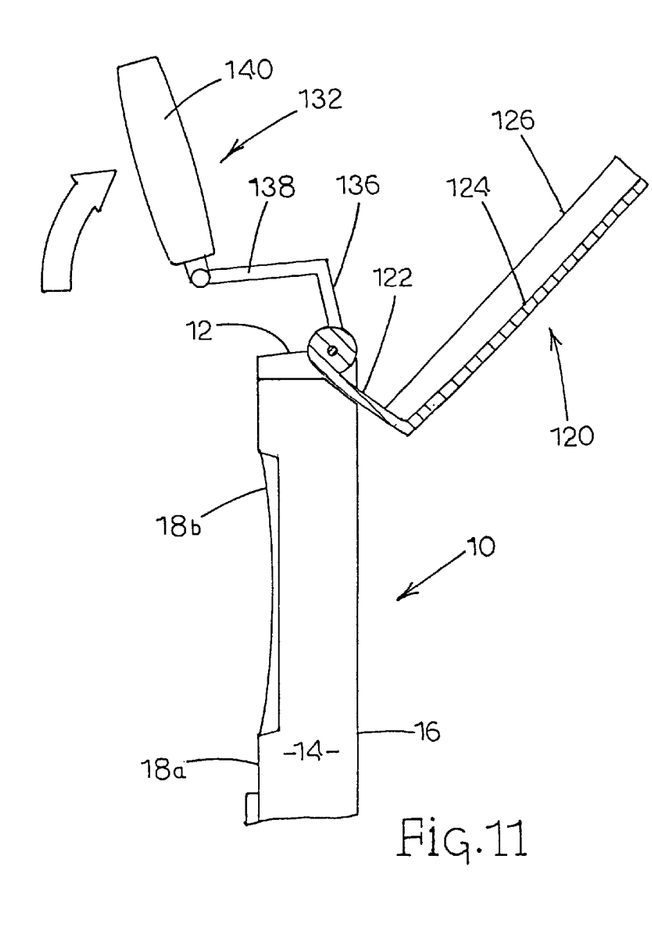
FIG. 11 is a fragmentary side elevational view similar to FIGS. 8, 9 and 10 but with both the antenna and speaker being rotated to the extended positions.

The speaker unit 132 can be adjusted by adjusting the frame of the speaker unit about the pivot axis 128 or by adjusting the speaker 140 about the transverse axis that couples the speaker 140 to the frame panels 136 and 138 of the speaker unit 132. In any event, by moving the speaker unit 132 to an extended position, the distance between the speaker 140 and the microphone 20 is effectively increased and consequently, the speaker 140 can be positioned closer to the ear of the user while the microphone 20 can be positioned closer to the mouth of the user. This means that voice communications passing between the user and the telephone 10 can be transmitted more efficiently and with clarity.

In the foregoing specification and discussion, details of the mobile telephone 10 have not been disclosed because such is not per se material to the present invention and because basic mobile and cellular telephone technology is known and appreciated by those skilled in the art. In fact, cellular telephones of the general type discussed herein are manufactured by a number of companies including Ericsson, Inc. of Research Triangle Park, Raleigh, N.C. Further, details of antenna and speaker construction are well known by those ordinarily skilled in the art. Some patents have disclosed movable antennas and movable speakers as well as connectors for coupling such movable antennas and speakers to electrical components housed within the radiotelephone. For example, see the disclosures found in U.S. Pat. Nos. 5,513,383; 5,461,672; 5,170,173; and 5,014,346. The disclosures of these four patents are expressly incorporated herein by reference.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A telephone, comprising:
   a housing having at least a top and a front;
   a first pivot axis disposed transversely across said top;
   an L-shaped antenna having first and second legs coupled to the telephone and rotatably mounted for movement about said first pivot axis between a retracted position wherein said first leg lies adjacent said top of said housing and said second leg extends adjacent said front of said housing and an extended position wherein both said first and second legs are rotated away from the top and front of the telephone housing; and
   a speaker unit moveably connected to said housing, said speaker unit moveable between a retracted position and an extended position.

2. The telephone of claim 1 wherein said speaker unit is movably connected to said housing for movement about said first pivot axis.

3. The telephone of claim 1 wherein said speaker unit is movably connected to said housing for rectilinear movement relative to said front between a retracted position and an extended position.

4. The telephone of claim 3 wherein said speaker unit forms an upper corner portion of the telephone in said retracted position and wherein said speaker unit projects past said top of said housing in said extended position.

5. The telephone of claim 1 wherein at least one of said legs of said antenna includes a panel that extends over said front and covers a substantial portion of said speaker unit when said antenna assumes said retracted position.

6. The telephone of claim 1 wherein the speaker unit includes a speaker frame and a speaker connected to the speaker frame, wherein said speaker frame connects said speaker unit to said housing via said first pivot axis.

7. The telephone of claim 6 wherein the speaker connects to the speaker frame about a second pivot axis that extends generally parallel to said first pivot axis.

8. The telephone of claim 7 wherein the speaker frame has a generally L-shaped configuration such that said speaker frame overlies at least a portion of both said top and said front in said retracted position.

9. A telephone, comprising:
   a housing having at least a top and a front;
   a first pivot axis disposed transversely across said top;
   a speaker unit rotatably connected to said housing and rotatable about said first pivot axis between an extended position and a retracted position wherein the speaker unit assumes a position adjacent to and overlying at least a portion of both said top and said front;
   an antenna rotatable about said first pivot axis between a retracted position relatively close to said housing and an extended position away from said housing; and
   wherein at least a portion of the speaker unit assumes a generally L-shaped configuration with respect to another portion of said speaker unit.

10. The telephone of claim 9 wherein said rotatable antenna includes a first leg and a second leg and has a generally L-shaped configuration.

11. The telephone of claim 10 wherein the antenna comprises at least one panel that assumes a position overlying both the speaker unit and the front of the housing in said retracted position.

12. A telephone, comprising:
    a housing having at least a top and a front;
    a first pivot axis disposed transversely across said top;
    a speaker unit rotatably connected to said housing and rotatable about said first pivot axis between an extended position and a retracted position wherein the speaker unit assumes a position adjacent to and overlying at least a portion of both said top and said front;
    an antenna rotatable about said first pivot axis between a retracted position relatively close to said housing and an extended position away from said housing;
    wherein at least a portion of the speaker unit assumes a generally L-shaped configuration with respect to another portion of said speaker unit; and
    wherein said speaker unit includes an L-shaped frame and a speaker pivotally connected to the L-shaped frame about a second pivot axis, said L-shaped frame pivotally connected to said housing for movement about said first pivot axis between a retracted position where said L-shaped speaker frame overlies a portion of said housing and an extended position where the speaker extends outwardly and away from said housing, and wherein the orientation of the speaker can be adjusted relative to both the speaker frame and the housing by pivoting the same about the second pivot axis.

13. The telephone of claim 12 including an antenna that is rotatable about said first pivot axis between a retracted position relatively close to said housing and an extended position away from said housing.

14. The telephone of claim 13 wherein said rotatable antenna includes a first leg and a second leg and has a generally L-shaped configuration.

15. The telephone of claim 14 wherein the antenna comprises at least one panel that assumes a position overlying both the speaker unit and the front of the housing in said retracted position.

16. A telephone, comprising:
    a housing structure having a top, a pair of sides, back, and a front including a key pad area;
    a pivot axis formed on the telephone;
    a speaker unit rotatably mounted on the pivot axis and rotatable between a retracted position and an extended position;
    the speaker unit including a frame and a speaker pivotally connected to the frame, and wherein the frame is in turn rotatably mounted on the pivot axis;
    an antenna coaxially mounted on the pivot axis with the speaker unit and movable between a retracted position where the antenna assumes a position relatively close to the telephone housing and an extended position where the antenna extends outwardly from the housing; and
    wherein the antenna includes a panel that, in the retracted position, assumes a position over the front of the telephone housing while the speaker assumes a position sandwiched between the panel and the front of the telephone housing.

17. The telephone of claim 16 wherein both the antenna and speaker unit assume a generally L-shaped configuration and wherein in the retracted position both the antenna and the speaker unit overlie portions of the top and front of the telephone housing with the antenna being disposed outwardly of the speaker unit such that in the retracted position the antenna overlies the speaker unit.

18. The telephone of claim 17 wherein the pivot axis extends transversely across the top portion of the telephone.

19. The telephone of claim 18 wherein the telephone includes a top-back edge portion that lies generally between the top and back of the telephone housing and wherein the pivot axis is disposed generally along the top-back edge portion of the telephone.

* * * * *